2,876,170

OXYGENATION OF STEROIDS IN THE 11β POSITION BY SPONDYLOCLADIUM

Joseph L. Sardinas, Brooklyn, and Gilbert M. Shull, Huntington Station, N. Y., assignors to Chas. Pfizer & Co., Inc., Brooklyn, N. Y., a corporation of Delaware No Drawing. Application January 23, 1957
Serial No. 635,600

7 Claims. (Cl. 195—51)

This invention is concerned with a method for the oxygenation of certain steroid compounds by means of selected cultures of microorganisms. In particular, it is concerned with the introduction of an hydroxyl group at the 11-position of the steroid nucleus in the β-configuration. A particularly useful reaction which may be accomplished with the present process is the conversion of compound S (Reichstein's Substance S or 17-hydroxy-11-desoxycorticosterone) to compound F (Kendall's Compound or 17-hydroxycorticosterone).

The preparation of biologically active steroid compounds, such as cortisone and compound F, is fraught with many great difficulties. One of the most difficult problems is the introduction of oxygen atoms at essential positions in the steroid nucleus, particularly at the 11-position of this nucleus. Compound S is available by known synthetic routes from variou naturally occurring, relatively cheap, steroid starting materials, such as the vegetable-type steroid compounds. Compound F, on the other hand, is considerably more difficult to obtain and is a very valuable compound, particularly useful in the treatment of rheumatoid arthritis and certain other conditions of the human body. Any process whereby compound S may be converted to compound F in good yield and without undue expense is of tremendous value to the pharmaceutical industry and to the public in general.

Methods have previously been reported for converting compound S to compound F by means of organisms entirely different than those described below for use in the present process. In U. S. Patent 2,658,023 there is described the use of Curvularia organisms, and in U. S. Patent 2,765,258, the use of Trichothecium. In U. S. Patent 2,602,769 there is described the use of Cunninghamella blakesleeana (of the order Mucorales) and in a publication appearing in the Journal of the American Chemical Society (vol. 74, p. 2381 (1952)) a process utilizing Streptomyces fradiae is described. A great number of microorganisms has been tested for their effectiveness in converting compound S to compound F. Most of these gave no indication of such 11β-hydroxylation.

It has now been found that organisms of the genus Spondylocladium give strikingly favorable results, allowing the preparation of such products as compound F in yields of 10-20% or more. Furthermore, the reactions can be conducted under such conditions that the products may be isolated with relative ease and in high purity.

It has been found that by contacting a steroid compound, in particular those having a methylene group at the 11-position, with the oxygenating activity of the selected microorganisms, i. e. with the organisms themselves or with enzyme systems of the organisms, the selective 11β-hydroxylation of these steroid compounds may be accomplished. Among other reactions which may be accomplished is the conversion of compound S to compound F. In addition, 11β-hydroxylation may be thus achieved on progesterone, 17-hydroxyprogesterone, pregnenolones, androstenedione, testosterone, desoxycorticosterone, a variety of pregnenes, androstenes, pregnanes and allopregnanes, 6-dehydroprogesterone, esters of the hydroxyl groups of these, etc.

The Spondylocladium genus belongs to the order Moniliales of the class Fungi Imperfecti. Of particular value are strains of the species S. australe and S. xylogenum. Other microorganisms from the genus may be selected for conducting the process of this invention by simple tests which will be described in more detail below. Many of these organisms are available in public culture collections and others may be isolated from natural materials, such as soil, by standard procedures well known to mycologists.

As indicated above, the process of the present invention may be used for the 11-β-oxygenation of a variety of steroid compounds which are unsubstituted in the 11-position of the nucleus. Various side chains may be present at the 17-position of the nucleus and keto or hydroxyl or ester groups may be present. The steroid compounds used as substrates for the reaction may also bear carbon to carbon double bonds at various points of the nucleus, such as the 3,4- or 5,6-position. It should be realized that the yield of oxygenated product will vary to some extent with the nature of the steroid compound used as starting material, with the particular strain of organism used, and with the conditions employed for the reaction (i. e. temperature, time, pH, nutrient medium, time at which the compound is added to the microorganism, etc.). Furthermore, a given oxygenating microorganism of the preferred species may show appreciable variation in its effect upon various steroid compounds, that is, a good yield of the corresponding 11-β-oxygenated derivative may be obtained with the use of a given oxygenating strain and a specific steroid compound, whereas a second steroid compound used under otherwise exactly identical conditions may give only a moderate or poor yield of the desired compound. Various methods may be used in the evaluation of the products produced by these processes. For instance, if a steroid compound with a suitable side chain is used, the proportion of the product produced may be evaluated by determination of the effect on adrenalectomized mice or upon the eosinophil count of experimental animals. Furthermore, the pure products produced by the hydroxylation reaction may be isolated as described below.

The effectiveness of a chosen microorganism for the process of this invention may be determined by cultivating the organism in a suitable nutrient medium containing carbohydrates, salts, cources or organic nitrogen and so forth. The steroid compound as a solid or as solution in a suitable solvent, for example, acetone or ethanol, is added to the cultivated microorganism under sterile conditions and the mixture is agitated and aerated in order to bring about the growth of the microorganism and oxygenation of the steroid substrate. The steroid may be added when the medium is seeded under sterile conditions with a culture of the microorganism or after growth of the organism is established. In some cases it may be found advisable to add the steroid compound after growth of the microorganism has been established in the nutrient medium under aerobic conditions. This is particularly true if, during the initial stages of growth of the microorganism, there is a tendency to produce undesired by-products from the steroid substrate. The acetate or other ester of a steroid may be used in place of the alcohol itself, although this may sometimes lead to an appreciably lowered yield of hydroxylated product. Alternatively, enzyme preparations from the growth of a suitable oxygenating organism of the genus may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient materials originally used to obtain growth of the microorganism are now absent as well as the various materials excreted by the growing organisms during the initial period. With some strains of the genus even better total yields of oxygenated products are obtained by this method than is the case when the steroid is added at the beginning or at an intermediate period directed to the whole fermentation broth. Other methods familiar to enzyme chemists may be utilized for conducting the present oxygenating process. The proportion of products and the rate of oxygenation, as well as the nature of the by-products formed, may vary depending on the use of the whole fermentation broth or of the isolated washed mycelium.

In general a concentration of not greater than one to two percent by weight of the total weight of substrate, for instance, the compound S-type material, is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i. e. growing microorganism or enzyme system, does not seem to greatly affect the yield and nature of the products under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenation process, the product may be recovered from the mixture by extraction with a suitable water-immiscible solvent. Chlorinated lower hydrocarbons, ketones, and alcohols are useful. These include chloroform, methylene chloride, trichlorethane, ethylene dichloride, and so forth. The use of hot ethylene dichloride, i. e. at from about 40° to about 80° C., is particularly favored for the extraction of the steroid products. The extract of product and unreacted starting material may be concentrated to a small volume or to dryness to obtain a solid product. Purification of the product may be accomplished in several ways. Most useful is the separation by means of chromatography of the product from the starting material and from other products, such as more highly oxygenated materials that may be formed during the reaction. Adsorbents such as silica gel or other suitable adsorbents are particularly useful for this purpose. It has been found that a column prepared from a mixture of silica gel and a lower alcohol, especially ethanol, is particularly useful for the separation of the steroid starting materials. The steroid mixtures may be applied to columns of adsorbents such as silica gel in concentrated chloroform or methylene chloride solution. The column may then be washed with additional amounts of the solvent to remove such impurities as fats and pigments. The adsorbed mixture then is separated by the gradual addition of a mixture of the solvent together with a small percentage, for example 1 to 5%, of a lower alcohol (methanol, ethanol, etc.). The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted material from chromatographic columns may be checked for the nature of the product by subjecting small portions of the solutions to chromatography on paper. Methods which are particularly useful for conducting this type of separation and analysis are described in detail in U. S. Patent 2,602,769, issued on July 8, 1952, to H. C. Murray et al., and in a publication by Shull et al. in the Archives of Biochemistry, vol. 37, p. 186 (1952). This method is also very useful for evaluating new strains of microorganisms to determine their usefulness in the process of this invention. The fermentation may be conducted on a small scale with the steroid as the substrate and the whole extract of the fermentation mixture may be concentrated and subjected to paper chromatography. By utilizing known samples of the steroid, e. g. compound S, compound F and other related products, for comparison, it is possible to determine whether the chosen microorganism is suitable for the present process.

Descending paper chromatograms utilizing paper treated with a 35% solution of propylene glycol in acetone or methanol and developed with a mixture of 78 volumes of toluene and 22 volumes of dioxane may be utilized for the rapid evaluation of various strains of the preferred microorganisms. Such a separation can be completed in as little as three hours and the paper chromatogram, after being dried, may be examined under ultraviolet light in a fluorescent scanner, such as that of Haines and Drake (Federation Proceedings 1950, vol. 9, p. 180), to determine the position of the various materials by their fluorescence. The zones in which the various substances occur may be marked and cut from the sheet or strip of paper. The material may then be eluted with a solvent such as ethanol and obtained as practically pure solid material by evaporation. A quantitative analysis of such a mixture may be accomplished in this manner. The amount of the isolated products may be determined, for example, by measuring the ultraviolet absorption of solutions of the materials. Particularly useful is the absorption characteristics of these compounds when dissolved in concentrated sulfuric acid.

After separation of the reaction products by column chromatography, the desired fractions may be combined and concentrated to a small volume. The product may then be crystallized from a suitable solvent such as ethyl acetate. One product prepared by application of the present process has been compared with samples of authentic compound F and has been found to be identical in all respects. Corticosterone prepared by the process of this invention has also been compared with a standard sample and shown to be identical with it.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example 1*

A culture of *Spondylocladium australe* was grown in flasks containing the following sterile medium:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

One hundred milliliters of this inoculum were added under sterile conditions to two liters of the following medium:

| | Percent |
|---|---|
| Sucrose | 1 |
| Difco tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

This mixture was adjusted to pH 7 with sulfuric acid and 0.25% of calcium carbonate was added before the mixture was sterilized. The inoculated medium was aerated at the rate of about one-half to one volume of air per volume of solution per minute at 27° to 28° C. for 24 hours. During this time the mixture was stirred at the rate of about 1700 revolutions per minute. One-half gram of compound S in the form of the alcohol was dissolved in 20 milliliters of 95% ethanol. The solution was added to the fermentation mixture under sterile conditions. The reaction was then continued for a further 24 hours under exactly the same conditions as described above.

The whole fermentation mixture was removed from the fermentation vessel. The mixture was extracted twice with an equal volume of ethylene dichloride at 70° C. The extracts were combined and evaporated to dryness. The dry solids were dissolved in a small volume of methylene chloride and the solution was added to a column of silica gel. The silica gel column had been prepared previously by treating each gram of silica gel with one milliliter of 95% ethanol. This mixture was suspended in methylene chloride and poured into a chromatographic column. After the steroid mixture had been introduced into the column it was washed with several portions of methylene chloride to remove fats and pigments. The column was then developed by adding a mixture of 97 volumes of methylene chloride and 3 volumes of ethanol. The eluate was divided into a series of small fractions. Portions of these were analyzed by means of the paper chromatographic system described above and those fractions containing the same compound were combined. It was found that the first material leaving the column was unreacted compound S. This material is recoverable and may be reused. The second material leaving the column was an unidentified steroid. The third material leaving the column was recovered and shown to be compound F. By removing the solvent from the combined fractions containing the compound F, there was obtained a yield of 20% of a dry product which may be readily further purified.

*Example II*

A culture of Spondylocladium xylogenum was cultivated on the same medium described in Example I under aerobic conditions. The mycelium from two liters of such a mixture obtained after 22 hours of growth was filtered, washed with a small volume of distilled water and then suspended in two liters of distilled water. One-half gram of compound S was added to the mixture. This preparation was stirred and aerated at the rate of one-half volume of air per volume of mixture per minute for 16 hours. The mixture was then extracted with one-half volume of chloroform three times. The combined chloroform extracts were concentrated to a small volume and the mixture of steroids was purified by chromatography on silica gel. Pure compound F was obtained.

*Example III*

Each of the organisms of the above examples was grown as described in Example I, except that in lieu of compound S the following steroid reactants containing 18 to 21 carbon atoms were employed:

Testosterone
Progesterone
o-dehydroprogesterone
Androstenedione
17-hydroxyprogesterone
Pregnenolone
3-keto-pregnane-20-ol
3-keto-allopregnane-20-ol
$\Delta^4$-pregnene-17$\alpha$,21-diol-3,20-dione
$\Delta^{1,4}$-pregnadiene-17$\alpha$,21-diol-3,20-dione In each instance the corresponding 11$\beta$-hydroxylated product was obtained, as expected.

A strain of the organism S. australe has been deposited at the American Type Culture Collection under the number ATCC 12728. A strain of the organism S. xylogenum has been deposited in the same collection under the number ATCC 12727.

What is claimed is:

1. A process for the 11$\beta$-hydroxylation of a steroid compound having a methylene group at the 11-position and containing 18 to 21 carbon atoms, which comprises contacting said steroid compound with the oxygenating activity of an organism chosen from the genus Spondylocladium.

2. A process as claimed in claim 1 wherein the steroid compound is subjected to the action of a growing culture of the microorganism.

3. A process as claimed in claim 1 wherein the microorganism is cultivated aerobically in a nutrient medium until substantial growth is obtained, the mycelium is separated from the broth and the compound is contacted with an aqueous suspension of the mycelium.

4. A process for the conversion of compound S to compound F, which comprises contacting compound S with the oxygenating activity of an organism chosen from the genus Spondylocladium.

5. The process of claim 4 wherein the organism is *Spondylocladium australe*.

6. The process of claim 4 wherein the organism is *Spondylocladium xylogenum*.

7. A process for the preparation of compound F, which comprises cultivating an organism chosen from the genus Spondylocladium in an aqueous nutrient medium under aerobic conditions until substantial growth is obtained, then separating the mycelium from the broth, and thereafter contacting compound S with an aqueous suspension of such mycelium.

References Cited in the file of this patent

UNITED STATES PATENTS

| 2,649,400 | Murray et al. | Aug. 18, 1953 |
| 2,658,023 | Shull et al. | Nov. 3, 1953 |
| 2,765,258 | Shull et al. | Oct. 2, 1956 |
| 2,777,843 | Chimerda et al. | Jan. 15, 1957 |

OTHER REFERENCES

Mycologia, "Manuscript," any issue, Lancaster Press, Inc., Lancaster, Pa.

Bessey: Morphology and Taxonomy of Fungi (1950), Blakiston, Philadelphia, Pa., pages 15–18.

Farlowia, December 1950, page 46.

Ainsworth: "Rules of Nomenclature for Fungi and Bacteria," J. General Microbiology, vol. 10 (1954), pages 465–474.

Annals of N. Y. Acad. Sci., vol. 60, art. 1, 1954, pages 4, 5, 24.